US012570529B2

(12) United States Patent
Seyrling et al.

(10) Patent No.: US 12,570,529 B2
(45) Date of Patent: Mar. 10, 2026

(54) OZONE GENERATION METHOD AND OZONE GENERATION DEVICE

(71) Applicant: SUEZ Groupe, Paris la Défense (FR)

(72) Inventors: Sieghard Seyrling, Daenikon (CH); Luca Ramoino, Uster (CH); Eugen Reisch, Zollikerberg (CH)

(73) Assignee: SUEZ Groupe, Paris la Défense (FR)

( * ) Notice: Subject to any disclaimer, the term of this patent is extended or adjusted under 35 U.S.C. 154(b) by 886 days.

(21) Appl. No.: 17/604,247

(22) PCT Filed: Apr. 15, 2020

(86) PCT No.: PCT/EP2020/060609
§ 371 (c)(1),
(2) Date: Oct. 15, 2021

(87) PCT Pub. No.: WO2020/212435
PCT Pub. Date: Oct. 22, 2020

(65) Prior Publication Data
US 2022/0194792 A1      Jun. 23, 2022

(30) Foreign Application Priority Data

Apr. 16, 2019     (EP) ..................................... 19305497

(51) Int. Cl.
*C01B 13/11*          (2006.01)
*B01J 23/40*          (2006.01)
(52) U.S. Cl.
CPC .............. *C01B 13/11* (2013.01); *B01J 23/40* (2013.01)
(58) Field of Classification Search
CPC .................................. C01B 13/11; B01J 23/40
See application file for complete search history.

(56) References Cited

U.S. PATENT DOCUMENTS

| | | | | |
|---|---|---|---|---|
| 2,876,188 | A | * 3/1959 | Thorp | ..................... C01B 13/11 95/228 |
| 6,197,091 | B1 | * 3/2001 | Ji | ......................... B01D 53/228 95/45 |
| 2012/0318146 | A1 | 12/2012 | Moon | |
| 2018/0369787 | A1 | * 12/2018 | Khader | .................. B01J 35/613 |

FOREIGN PATENT DOCUMENTS

| | | | |
|---|---|---|---|
| GB | 785 671 | * | 3/1956 |
| GB | 785671 | A | 10/1957 |
| JP | 2005145762 | A | 6/2005 |

OTHER PUBLICATIONS

Marin et al., Chemical Engineering Journal, (2009), v.147, p. 356-365.*
Foreign Communication from a Related Counterpart Application, International Search Report and Written Opinion dated Jun. 15, 2020, International Application No. PCT/EP2020/060609 filed on Apr. 15, 2020.
Foreign Communication from a Related Counterpart Application, Extended European Search Report dated Oct. 7, 2019, International Application No. PCT/EP2020/060609 filed on Apr. 15, 2020.

* cited by examiner

*Primary Examiner* — Yong L Chu
(74) *Attorney, Agent, or Firm* — Conley Rose, P.C.

(57) ABSTRACT

An ozone generation method comprising:
Supplying a crude feed gas comprising oxygen and methane
Performing a catalytic oxidation of methane from the crude feed gas to obtain a treated feed gas
Generating ozone from the treated feed gas.

8 Claims, 2 Drawing Sheets

OZONE GENERATION METHOD AND OZONE GENERATION DEVICE

CROSS-REFERENCE TO RELATED APPLICATIONS

The present application is a filing under 35 U.S.C. 371 as the National Stage of International Application No. PCT/EP2020/060609, filed Apr. 15, 2020, entitled "OZONE GENERATION METHOD AND OZONE GENERATION DEVICE," which claims priority to European Application No. 19305497.0 filed with the European Patent Office on Apr. 16, 2019, both of which are incorporated herein by reference in their entirety for all purposes.

FIELD OF THE INVENTION

The present invention relates to an ozone generation method and to an ozone generation device.

BACKGROUND OF THE INVENTION

Ozone is widely used in a variety of industries for its properties of cleaning, disinfection, bleaching, deodorization and chemical oxidation.

Ozone is usually produced from a feed gas of substantially pure oxygen. However, pure oxygen is usually contaminated by a tiny amount of methane, for example one to hundreds of ppm.

This tiny amount of methane can be detrimental to the production of ozone and can decrease the overall efficiency of an ozone generator. Document GB 785 671 discloses a process of catalytic oxidation of methane in a raw gas comprising essentially oxygen. However, this process requires a high temperature of 788° C. and is not economically and environmentally viable.

Consequently, there is a need to propose an improved ozone generation method and an improved ozone generation device that is economically and environmentally viable.

SUMMARY OF THE INVENTION

This above objective is accomplished by an ozone generation method comprising:

Supplying a crude feed gas comprising oxygen and methane

Performing a catalytic oxidation of methane from the crude feed gas to obtain a treated feed gas Generating ozone from the treated feed gas.

The present method allows to save energy required to generate ozone by avoiding methane degradation into the ozone generator.

Advantageously, the present method comprises the additional step of heating the crude feed gas to a temperature of at least 150° C., preferably at least 200° C. again preferably at least 220° C. and at most preferably 300° C. or 340° C. before and/or during performing the catalytic oxidation of methane from the crude feed gas to obtain the treated feed gas. This heating step allows to achieve a high oxidation rate of the methane from the crude feed gas. Preferably, the crude feed gas is heated to a temperature of at most 700° C., more preferably at most 530° C. and again preferably at most 440° C.

In a preferred embodiment, the present method comprises the additional steps of:

Recovering at least a part of the heat from the treated feed gas

Heating the crude feed gas with the recovered heat before or during the heating the crude feed gas to a temperature of at least 150° C. and/or at most 700° C.

Reusing part of the heat of the treated feed gas allows to enhance the overall energetic efficiency of the ozone generation method.

Advantageously, the step of performing the catalytic oxidation is performed with a catalyst chosen among platinum, palladium, ruthenium, rhodium, rhenium, chromium, cobalt, copper, gold or combinations thereof, in particular as oxides. Preferably, the catalytic oxidation is performed with a catalyst chosen among palladium, platinum and platinum-palladium, which provides an efficient oxidation of methane at a moderate temperature of the crude feed gas. Again preferably, the catalyst is palladium.

Advantageously, the method comprises the additional step of drying the treated feed gas to remove at least some, preferably most and again preferably all water before generating ozone from the treated feed gas. Drying the treated feed gas could be achieved by sorption, for example absorption or adsorption. This could also be achieved by condensing water under low temperature. Removing water resulting for example from the methane oxidation allows to increase the efficiency of the ozone generation.

Advantageously, the method comprises the additional step of cooling the treated feed gas, for example to a temperature of at most 70° C., preferably at most 50° C. and again preferably to room temperature, before generating ozone from the treated feed gas, in order to increase the efficiency of the ozone generation.

In a preferred embodiment, the method comprises the additional step of cooling the ozone generator with a cooling liquid. For example, the step of cooling the treated feed gas is performed with at least part and preferably all of the cooling liquid outputted from the ozone generator.

A second aspect of the present invention relates to an ozone-generation device, comprising:

A supply of a crude feed gas comprising oxygen and methane

A catalytic unit adapted to perform a catalytic oxidation of methane from the crude feed gas to obtain a treated feed gas An ozone generator adapted to be fed by the treated feed gas.

Advantageously, the ozone generation device further comprises a heating unit adapted to heat the crude feed gas and/or to heat the catalytic unit to at least 150° C., preferably at least 200° C., again preferably at least 220° C. and at most preferably 300° C. or 340° C. For example, the heating unit is adapted to heat the crude feed gas to a temperature of at most 700° C., more preferably at most 530° C. and again preferably at most 440° C.

Advantageously, the ozone generation device further comprises a heat exchanger adapted to recover at least part of the heat from the treated feed gas and to heat or pre-heat the crude feed gas and/or the catalytic unit with the recovered heat.

Advantageously, the ozone generation device further comprises a drying unit adapted to remove at least some, preferably most and again preferably all water from the treated feed gas.

Advantageously, the ozone generation device further comprises a cooling unit adapted to cool the treated feed gas, for example to a temperature of at most 70° C., at most 50° C., at most 30° C. or room temperature. Preferably, the cooling unit is adapted to cool the treated feed gas to 50° C. and below.

Advantageously, the ozone generator is adapted to be cooled by a cooling liquid. For example, the ozone generation unit comprises circulation means adapted to circulate toward the cooling unit at least part of the cooling liquid outputted from the ozone generator and preferably all the cooling liquid.

In a preferred embodiment, the catalytic unit comprises a catalyst chosen among platinum, palladium, ruthenium, rhodium, rhenium, chromium, cobalt, copper, gold or combinations thereof, in particular as oxide.

In a preferred embodiment, the catalyst is supported on a appropriate support such as alumina or carbon and preferably a ceramic support such as alumina. Ceramic support other than alumina includes $ZnAl_2O_4$ spinel, silica and silicate.

Examples of catalyst comprise lanthanum and ruthenium oxide, such as $La_{3.5}Ru_{4.0}O_{13}$ supported on alumina, platinum, palladium, platinum-palladium or rhenium supported on alumina, gold, cobalt oxide such as $Co_3O_4$ supported on alumina, chromium oxide such as $ZnCrO_4$, $CuCrO_4$, $PbCrO_4$ or $Cr_2O_3$ supported on alumina, copper oxide supported on alumina and manganese oxide such as $La_{0.6}Sr_{0.4}MnO_3$.

An advantageous catalyst consists of palladium supported on alumina preferably under the form of spheres. Another advantageous catalyst consists of a combination of platinum and palladium supported on alumina.

For example, the catalyst may be placed as a bulk powder, as spheres, as a granular material or as a honeycomb structure into the catalytic unit.

A third aspect of the present invention is a treatment method for a feed gas of an ozone generator, the method comprising the steps of:

Supplying a crude feed gas containing oxygen and methane

Optionally heating the crude feed gas to a temperature of at least 150° C., preferably at least 200° C. again preferably at least 220° C. and at most preferably 300° C. or 340° C., and/or to a temperature of at most 700° C., preferably at most 530° C. and again preferably at most 440° C.

Performing a catalytic oxidation of methane from the crude feed gas to obtain a treated feed gas, preferably on a catalyst comprising palladium or platinum-palladium.

Advantageously, the treatment method further comprises the additional steps of:

Recovering at least part of the heat from the treated feed gas,

Heating the crude feed gas with the recovered heat before or during heating the crude feed gas to a temperature of at least 150° C.

A fourth aspect of the present invention relates to a catalytic device adapted to treat a crude feed gas of an ozone generator, the catalytic device comprising:

An optional heating unit adapted to heat a crude feed gas containing oxygen and methane to at least 150° C., preferably at least 200° C., again preferably at least 220° C. and at most preferably 300° C. or 340° C., and/or at most 700° C., preferably at most 530° C. and again preferably at most 440° C.

A catalytic unit adapted to perform a catalytic oxidation of methane from the crude feed gas to obtain treated feed gas.

Advantageously, the catalytic device further comprises a heat exchanger adapted to recover at least part of the heat from the treated feed gas and the heat exchanger is further adapted to use the recovered heat in order to heat the crude feed gas before or during heating by the heating unit.

In a preferred embodiment, the catalytic unit comprises platinum, palladium, ruthenium, rhodium, rhenium, chromium, cobalt, gold or combination thereof, such as oxide. Preferably, the catalytic unit comprises palladium or platinum-palladium.

In a preferred embodiment, the catalyst is supported on a appropriate support such as alumina or carbon and preferably a ceramic support such as alumina. Ceramic support other than alumina includes $ZnAl_2O_4$ spinel, silica and silicate.

Examples of catalyst comprise lanthanum and ruthenium oxide, such as $La_{3.5}Ru_{4.0}O_{13}$ supported on alumina, platinum, palladium, platinum-palladium or rhenium supported on alumina, gold, cobalt oxide such as $Co_3O_4$ supported on alumina, chromium oxide such as $ZnCrO_4$, $CuCrO_4$, $PbCrO_4$ or $Cr_2O_3$ supported on alumina, copper oxide supported on alumina and manganese oxide such as $La_{0.6}Sr_{0.4}MnO_3$.

An advantageous catalyst consists of palladium supported on alumina. Another advantageous catalyst consists of a combination of platinum and palladium supported on alumina.

For example, the catalyst may be placed as a bulk powder, as a granular material, as spheres or as a honeycomb structure into the catalytic unit.

BRIEF DESCRIPTION OF THE DRAWINGS

Further advantages and preferred embodiments of the present invention will become apparent from the following detailed description and drawing, in which.

DETAILED DESCRIPTION

The present ozone generation method and ozone generation device are intended to be used in all places and for all applications requiring ozone. For example, ozone can be used for disinfecting, deodorizing, sanitizing, cleaning, killing insects or parasites or as a raw material for the chemical industry. The present ozone generation device can be installed in a fixed location, for example as part of a dedicated industrial facility, such as a water treatment plant. Alternatively, the present ozone generation device can be mobile, for example as a mobile agricultural treatment unit or into a cruising ship for laundry cleaning and/or swimming pool sanitation.

Ozone Generation Device

Figure 1:
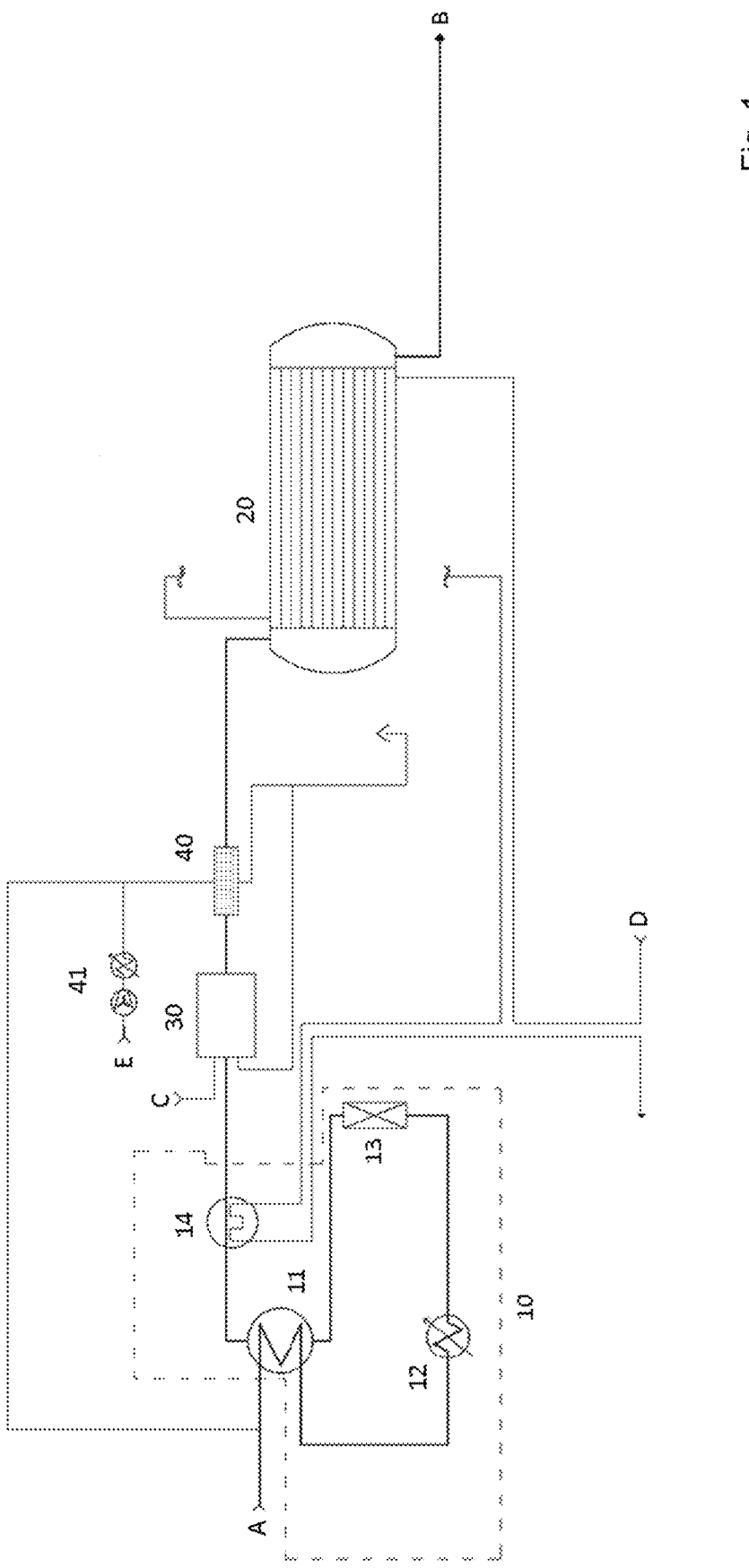
FIG. 1 is a schematic view of an ozone generation device according to the present invention

Now referring to FIG. 1, the ozone generation device according to the present invention comprises a crude feed gas input A as a supply, a catalytic device 10, an ozone generator 20 and an ozone output B.

The catalytic device 10 may comprise a heat exchanger 11, a heating unit 12 and comprises a catalytic unit 13. In addition, the catalytic device 10 may further comprise a cooling unit 14.

Downstream the catalytic device 10, a mixer 30 and a drying unit 40 can be placed upstream the ozone generator 20.

Ozone Generation Method

A crude feed gas can be produced by a conventional method and consists essentially of oxygen, for example more than 99.9% v/v of oxygen. The crude feed gas may be contaminated by a tiny amount of methane, for example less than 0.1% v/v of methane and usually 10 to 100 ppm. Non-reactive gas such as nitrogen and/or argon may also be present into the crude feed gas for example below 10% v/v.

Such a crude feed gas is fed into the gas circuit of the ozone generator by the crude feed gas input A at a relative pressure of 0.1 to 1.5 MPa and preferably 0.2 to 1.0 MPa and is then treated by the catalytic device 10.

The crude feed gas can be heated in an optional preheating step into the heat exchanger 11 and then in an optional but preferred heating step in the heating unit 12. The crude feed gas can be brought to room temperature if it is colder and preferably to a temperature of at least 150° C., preferably at least 200° C., again preferably at least 220° C. and at most preferably 300° C. or 340° C. In order to save costs and to preserve the environment, the crude feed gas temperature is at most 700° C., preferably at most 530° C. and again preferably at most 440° C.

The heated crude feed gas is then treated into the catalytic unit and a catalytic oxidation of methane can occur according to the following equation:

$$CH_4+O_2\rightarrow CO_2+H_2O$$

Due to the catalysis performed into the catalytic unit and the important proportion of oxygen in view of methane, a very quick oxidation reaction can occur, thus removing or decreasing the proportion of methane into the treated feed gas in view of the crude feed gas.

After treatment into the catalytic unit 13, the treated feed gas is optionally introduced again into the heat exchanger 11 in order to recover heat from the treated feed gas and to perform the optional preheating step of the crude feed gas, thus increasing the global energetic efficiency of the catalytic device.

The treated feed gas may then be cooled into the cooling unit 14. The cooling unit 14 can be either part of the catalytic device 10 as shown in FIG. 1 or be outside the catalytic device 10. After cooling, the treated feed gas has a temperature of room temperature to 70° C., preferably room temperature to 50° C.

The cooled treated feed gas may then be introduced into a mixer 30 comprising a gas input C in order to introduce air or nitrogen into the treated feed gas.

The mixed treated feed gas can then be dried into the drying unit 40, in order to remove at least some and preferably most or all the water contained into the treated feed gas. This water may come from the catalytic oxidation of methane and/or from the air or nitrogen introduced by the mixer 30.

The dried treated feed gas, outputted from the drying unit 40 can then be introduced into the ozone generator 20 in order to produce ozone, outputted by ozone output B to any ozone application.

The ozone generator can be cooled by a cooling liquid such a water, fed by cooling liquid input D. Preferably, the cooling liquid may also be used as a cooling liquid for the cooling unit 14, as shown in FIG. 1, in order to limit the flow of wasted cooling liquid.

Catalytic Unit

The catalytic unit 13 is preferably an inflow cartridge, for example made of stainless steel and partially filled with a catalyst adapted to catalyse oxidation of methane.

Generally speaking, the catalyst can be selected from platinum, palladium, ruthenium, rhodium, rhenium, chromium, cobalt, copper, gold, under pure form or as oxide, and their combinations.

The catalyst may be supported on an appropriate support such as alumina or carbon, and preferably a ceramic support such as alumina. Ceramic support other than alumina includes $ZnAl_2O_4$ spinel, silica and silicate.

Examples of catalyst comprise lanthanum and ruthenium oxide, such as $La_{3.5}Ru_{4.0}O_{13}$ supported on alumina, platinum, palladium, platinum palladium or rhenium supported on alumina, gold, cobalt oxide such as $Co_3O_4$ supported on alumina, chromium oxide such as $ZnCrO_4$, $CuCrO_4$, $PbCrO_4$ or $Cr_2O_3$ supported on alumina, copper oxide supported on alumina and manganese oxide such as $La_{0.6}Sr_{0.4}MnO_3$.

A preferred catalyst consists of palladium supported on alumina or palladium-platinum supported on alumina. The catalyst may be placed as a bulk powder, as a granular material or as a honeycomb structure into the catalytic unit.

The catalytic unit may be heated for example by an electrical resistor to at least 150° C., preferably at least 200° C., again preferably at least 220° C. and at most preferably 300° C. or 340° C. In order to save costs and to preserve the environment, the crude feed gas temperature is at most 700° C., preferably at most 530° C. and again preferably at most 440° C.

The catalytic unit 13 may be dimensioned according to the flow rate of crude feed gas, the amount of methane into the feed gas and the selected catalyst.

Cooling Unit, Heating Unit and Heat Exchanger

The heat exchanger 11 may be tubular and may use heat recovered from the treated feed gas. Alternatively, the heat exchanger 11 may be replaced by a simple heater based on power supply, on an external hot fluid or on a liquid fuel.

The heating unit 12 may use power such as an electrical resistor, an external hot fluid or a liquid fuel. For example, the heating unit 12 may be a heat exchanger of the same kind as the heat exchanger 11. Alternatively or in combination, the heating unit 12 may be integrated to the catalytic unit 13. Alternatively or in combination, the heat exchanger 11 and the heating unit 12 may be the same unit performing both heat recovery from the treated heat gas and heating the crude feed gas by additional heating means.

Finally, the cooling unit may comprise a tubular liquid-gas heat exchanger using as a cooling liquid: cold water, tap water or any cooling liquid outputted from the ozone generator such as water. Preferably, the cooling unit decreases the temperature of the feed gas to 100° C. or less, preferably 75° C. or less and again preferably 50° C. or less, or even to room temperature.

Drying Unit

The drying unit 40 is intended to remove at least part of the water contained in the treated feed gas and may be based on the capture of water molecules into or on a specific material, for example by sorption. For example, the dry material could be an adsorbent such as zeolites, molecular sieves, alumina, silica gel or activated carbon.

In this case, a regeneration system 41 comprising an air input E, a compressor and a heater could be used for periodic regeneration of the drying unit 40.

Alternatively, water removal could be performed by condensing water under low temperature for example in a condensing unit adapted to decrease temperature of the feed gas. This condensing unit could be the same unit as the above cooling unit.

Ozone Generator

Ozone generator 20 may be based on any ozone generation method and preferably on corona discharge. Other kinds of ozone generation methods comprise ultraviolet light and cold plasma, all of them providing advantageous results as part of the present invention.

Although the present invention has been described and illustrated in detail, it is clearly understood that the same is by way of illustration and example only and is not to be taken by way of limitations, the scope of the present invention being limited only by the terms of the appended claims.

In particular, it is clear that the ozone generation device of FIG. 1 comprises all required valves, controllers and sensors, as known by the skilled person. It is also clear that the required safety equipment linked with the feed gas, the ozone produced or the heating temperature may be added to the present ozone generating device.

EXAMPLES

In a first example, a 500 cubic centimetre (cc) cartridge filled with platinum supported on alumina achieved 100% methane oxidation of 250 cc/s crude feed gas comprising up to 100 ppm methane at a temperature of 400° C. The residence time of the feed gas into the cartridge, i.e. the time required for the feed gas to pass through the cartridge is at most 10 s, preferably at most 3 s and again preferably 1 or 2 s.

The same catalytic unit achieved 75 to 80% of methane oxidation in a similar experiment performed with a crude feed gas at room temperature.

In a second example, a crude feed gas comprising oxygen and 40 to 70 ppm of methane was injected in a catalytic unit at a pressure of 5.5 Bar-g and a flow rate of 750 N dm$^3$/s. The catalytic unit consisted in a cylindrical vertical pipe of a diameter of 41.8 mm (DN40) and a volume of 150 ml. Catalyst under the form of 2-4 mm alumina spheres loaded with Palladium was introduced in the catalytic unit. The residence time of the crude feed gas into the catalytic unit was 1.8 s. The crude feed gas was heated to temperatures of 60° C., 130° C., 200° C., 220° C., 280° C., 340° C. and 410° C.

The proportion of methane into the treated feed gas was followed thanks to an infrared spectrometer and the absorption of methane was monitored at a wavenumber of 3020-3010 cm$^{-1}$ (wavelength of 3311 to 3322 nm).

Figure 2:
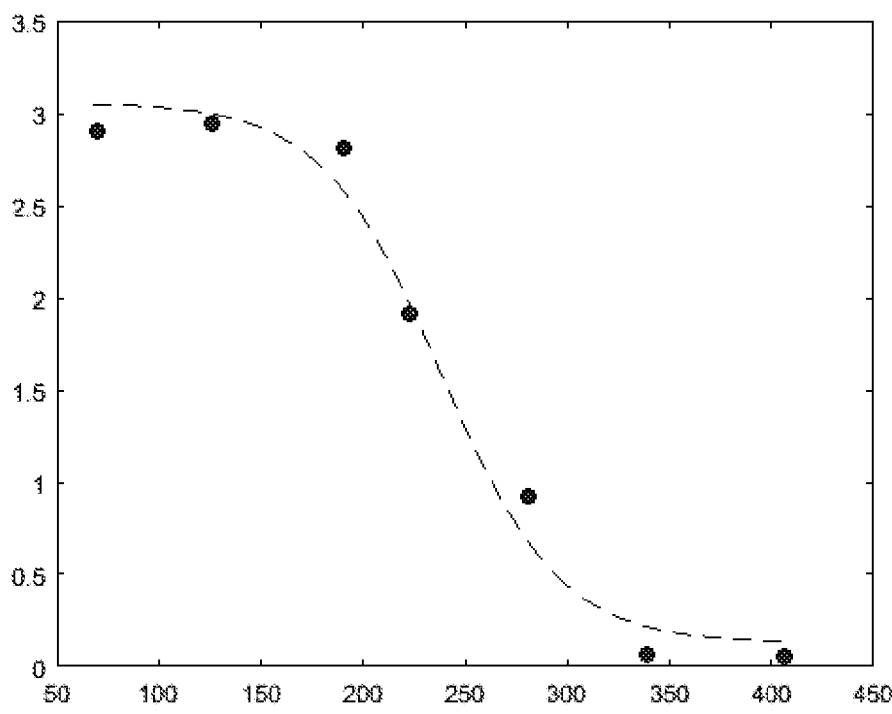
FIG. 2 shows a graph of a value of peak absorption (Y-axis) of the methane at 3020-3010 $cm^{-1}$ in the treated feed gas, as a function of the temperature of the crude feed gas during the step of catalytic oxidation (X-axis).

As visible in FIG. 2 showing values of the peak absorption of methane at 3020-3010 cm$^{-1}$ in the treated feed gas, according to various temperature of the crude feed gas, the absorption of methane, initially at 3% below 200° C. progressively decreases from 200° C. to reach almost 0% (no absorption) at 340° C. and above.

In addition, a scaled tanh curve has been fit to the measured values (dashed line), showing the tendency of the reduction of methane in the treated feed gas and such a reduction is significant at a temperature of at least 220° C. and very significant at a temperature of at least 300° C. The oxidation of methane is almost completed at a temperature of 340° C. and fully completed at a temperature of 410° C.

Figure 3:
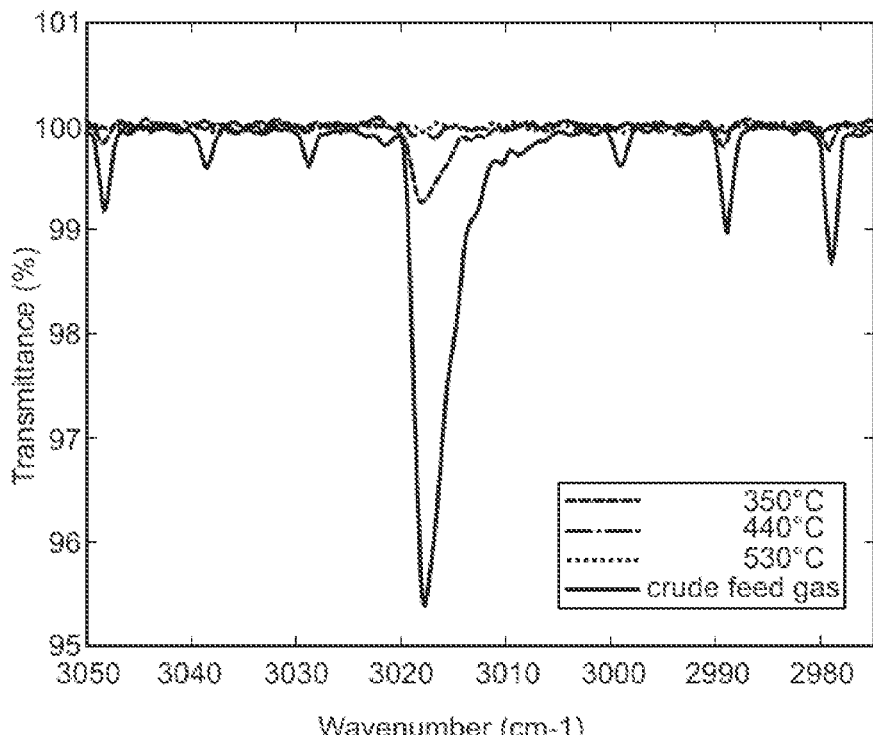
FIG. 3 shows an IR transmission spectrum of the treated feed bas, at different temperatures of the crude feed gas during catalytic oxidation.

In FIG. 3, the absorption peak of methane at a wavenumber of 3020-3010 cm$^{-1}$ in the treated feed gas after catalytic oxidation at 350° C., 440 and 530° C. is directly plotted at the same scale versus the absorption peak of the crude feed gas. Before treatment, the crude feed gas shows an important absorption peak and the area of the peak is very significantly reduced at catalytic oxidation temperature of 350° C. At temperatures of 440° C. and 530° C., methane absorption is not visible anymore and the treated feed gas is thus free of methane.

The invention claimed is:

1. An ozone generation method comprising:

Supplying a crude feed gas comprising oxygen and methane with less than 0.1% v/v of methane;

Performing a catalytic oxidation of methane from the crude feed gas to obtain a treated feed gas by:

Heating the crude feed gas to a temperature of at least 150° C. and at most 700° C. before and/or during performing the catalytic oxidation of methane from the crude feed gas to obtain the treated feed gas;

Recovering at least part of the heat from the treated feed gas and heating the crude feed gas with the recovered heat from the treated feed gas in a closed-loop integrated thermal system before and/or during heating of the crude feed gas to the temperature of at least 150° C. and at most 700° C.; and Cooling the treated feed gas to at most 70° C.; and Generating ozone from the cooled treated feed gas.

2. The ozone generation method according to claim 1, wherein the catalytic oxidation is performed with a catalyst chosen among palladium, platinum, and platinum-palladium.

3. The ozone generation method according to claim 1, comprising the additional step of drying the treated feed gas to remove at least some water before generating ozone from the treated feed gas.

4. The ozone generation method according to claim 1, comprising the additional step of cooling the ozone generator with a cooling liquid.

5. The ozone generation method according to claim 4, wherein the step of cooling the treated feed gas is performed with at least part of the cooling liquid outputted from the ozone generator.

6. The ozone generation method according to claim 1, wherein the crude feed gas is heated to the temperature of at least 150° C. and at most 700° C. before performing the catalytic oxidation of methane from the crude feed gas to obtain the treated feed gas, and wherein the at least part of the heat from the treated feed gas is recovered to heat the crude feed gas before and/or during heating of the crude feed gas to the temperature of at least 150° C. and at most 700° C.

7. The ozone generation method according to claim 1, wherein after cooling, the treated feed gas has a temperature of room temperature to 70° C.

8. The ozone generation method according to claim 1, wherein the heating of the crude feed gas to the temperature of at least 150° C. and at most 700° C. is a continuous preheating step, and wherein the recovered heat from the treated feed gas is used during the continuous preheating step to heat the crude feed gas to the temperature of at least 150° C. and at most 700° C.

* * * * *